Patented Oct. 6, 1942

2,298,032

UNITED STATES PATENT OFFICE 2,298,032

TITANIUM SOLUTION PRODUCTION

L'Roche G. Bousquet, Baldwin, and Maxwell J. Brooks, New York, N. Y., assignors to General Chemical Company, New York, N. Y., a corporation of New York No Drawing. Application March 29, 1940, Serial No. 326,672

8 Claims. (Cl. 23—87)

This invention deals with manufacture of crystalloidal, relatively low acidity factor titanium salt solutions. The invention relates generally to methods for reducing the acidity factor of crystalloidal titanium salt solutions without disturbing their crystalloidal characteristics. More particularly, the invention is directed to methods for making, from crystalloidal relatively high acidity factor titanium salt solutions crystalloidal titanium salt solutions having within certain limits any desired lower acidity factor, for example crystalloidal titanium salt solutions having acidity factors of around zero or if desired even substantially less than zero, i. e., a minus acidity factor. While applicable to production of low acidity factor titanium salt solutions in general, for convenience and purpose of illustration, principles of the invention are herein discussed largely in connection with titanium sulfate solutions.

As known in the art relating to production and use of titanium sulfate solutions, percent "acidity factor" or "factor of acidity" (represented by F. A.) of a titanium sulfate solution is the ratio (multiplied by 100) of the so-called free $H_2SO_4$ (i. e. acid not combined with bases or with titanium as $TiOSO_4$) and the titanium equivalent acid based on $TiOSO_4$ (i. e., the acid constituent of $TiOSO_4$ as such). Free acid plus acid combined with titanium to form $TiOSO_4$ as such is designated "active acid." In terminology of the art, zero F. A. represents a condition in which all titanium in solution is present as titanyl sulfate ($TiOSO_4$), and 100% F. A. represents condition in which all titanium is present as normal tetravalent titanium disulfate, $Ti(SO_4)_2$. Titanium sulfate solution containing less acid than needed to combine with bases other than titanium and to form $TiOSO_4$ with the titanium present is designated as having minus acidity factor. For example, in a case where solution conditions are such that substantially all of the titanium has been precipitated out as hydrate, e. g. as a result of neutralization of all of the acid, F. A. of the mother liquor is about minus 100%. Similarly, F. A. of a titanium chloride solution is the ratio (multiplied by 100) of the so-called free HCl (i. e., acid not combined with bases or with titanium as $TiOCl_2$) and the titanium equivalent acid based on $TiOCl_2$ (i. e. the acid constituent of $TiOCl_2$ as such).

The crystalloidal state of titanium salt solutions is characterized by absence of colloidal titanium compound. A satisfactory, sensitive test for absence of colloidal titanium is that which shows absence of coagulated titanium when a sample of the solution to be tested is treated with an equal volume of concentrated (35-37%) hydrochloric acid. In practice of this test, any colloidal titanium in the sample is coagulated immediately on dilution with hydrochloric acid. Should colloidal titanium content of the sample be substantial, coagulated material though suspended and unsettled is readily visible to the naked eye. If no coagulated material is visible the hydrochloric acid treated sample may be settled for a substantial period of time, and filtered or centrifuged in a high-speed centrifuge. If analysis of the filtrate or of the centrifuged liquor shows the same total titanium (calculated as $TiO_2$) content by weight as did the sample prior to hydrochloric acid dilution, the sample tested contained no colloidal titanium. If analysis of the filtrate or the centrifuge liquor shows appreciably less total titanium than that of the sample prior to hydrochloric acid dilution, it will be evident the sample contained colloidal titanium in amount corresponding with the total titanium deficiency of the filtrate or centrifuge effluent subjected to analysis.

In practice, occasions arise in which it is desirable to have available crystalloidal titanium sulfate solutions of moderately low F. A. say 40-60%, or in the neighborhood of zero or below. It is known that titanium sulfate solutions having F. A. of the order of say 35-30% or possibly lower can be made by direct sulfuric acid attack on titaniferous ores and leaching the resulting mass with water. This procedure has two serious commercial disadvantages. First, in order to obtain low F. A. it is necessary to use such relatively small amount of sulfuric acid that titanium recovery from the ore is too low for commercial purposes. Second, solutions themselves produced in this way, while having relatively low F. A., almost invariably contain titanium in colloidal form with the result that, as known, such solutions are notoriously unstable on account of premature hydrolysis initiated by the presence of colloidal titanium.

Literature and patents describe production of solutions having low acidity factor. While F. A. may be low, such solutions are not crystalloidal because of presence of colloidal titanium compound. Further, it is known that acidity factor of high F. A., e. g. 55-90%, titanium sulfate solution may be reduced by acid binding or neutralizing agents such as basic compounds. While possible by use of such materials to reduce F. A. of crystalloidal, high acid titanium sulfate solution, low F. A. solutions produced by previous prior art methods contain large amounts of titanium in colloidal form, and hence are non-crystalloidal and extremely unstable. In fact it is because of presence of colloidal titanium and resulting instability that solutions made by these prior neutralizing methods are said to be useful as seeding agents in hydrolytic precipitation of metatitanic acid from titanium sulfate solutions.

One of the principal objects of this invention is to provide methods for reducing acidity factor of crystalloidal titanium salt solutions without disturbing their crystalloidal status and to thereby make possible production of crystalloidal titanium salt solution having F. A. lower than that of the initial crystalloidal titanium salt starting solution. Another object is to afford methods for reducing acidity of crystalloidal titanium salt solutions in such a way as to prevent colloidal titanium compound formation during acidity reduction. The invention further aims to provide methods for making crystalloidal titanium salt solutions of low F. A. from crystalloidal relatively high acidity factor titanium salt solutions by procedure in which operating precautions needed to prevent formation of colloidal titanium are simple and easily controlled.

In carrying out the invention as applied to production of low F. A. titanium sulfate, crystalloidal titanium sulfate solution used as starting or initial solution may be of any suitable relatively high F. A. For example, such a solution may be prepared by digesting ground ilmenite with sulfuric acid, clarifying the liquor, concentrating and cooling to remove part of the iron as $FeSO_4.7H_2O$, all as well known. In present state of the art by far the bulk of titanium compounds manufactured are obtained by direct sulfuric acid attack on ores such as ilmenite. It is customary, in order to obtain satisfactory titanium extraction from ore and to form crystalloidal titanium sulfate solutions which will not hydrolyze on storage, to use acid in quantity to form titanium sulfate solution having F. A. from above say 55 to 100%, general practice being such that crude titanium sulfate solutions resulting from ore-acid digestion operation have acidity factors well in the range of about 60–85%. Relatively high F. A. solutions of this general type constitute commercially satisfactory starting solutions for making crystalloidal low F. A. solutions by the methods of the present invention, since such high F. A. solutions are not only crystalloidal but are made in a way affording satisfactory titanium recovery from ore.

We reduce acidity factor of an initial solution by increasing, for example by a hereafter detailed oxidation operation, the amount of initial solution acid radical associated with metal (other than titanium) present in the solution, thereby decreasing the acidity factor of the resulting solution. This intermediate solution, optionally constituting one of the products of the process of the invention, is a crystalloidal titanium sulfate solution of F. A. lower than that of the high F. A. starting solution. If desired to still further decrease acid factor of such solution, according to the second phase of the invention process, the solution is then treated with certain hereafter disclosed acid binding agents to lower the acidity factor to the sought for value. Procedure we have discovered is such as to make it feasible to first secure satisfactory titanium extraction from titaniferous ores by fully adequate amount of acid with resultant production of crystalloidal titanium sulfate solution having high titanium concentration and relatively high F. A. Using a solution of this nature as starting solution, in accordance with the present improvements it is then possible to produce crystalloidal titanium sulfate solution having within certain limits any desired predetermined lower acidity factor. In practical commercial operations, for reasons not important here, it is often desirable to subject to hydrolysis a titanium sulfate solution (e. g. to precipitate crude metatitanic acid) having F. A. something less than the acidity factor of a typical titanium sulfate solution formed when titaniferous ores are digested with a sufficiently large quantity of acid as to obtain maximum commercially feasible titanium extraction from ore. The present improvements thus make possible use in an ore-acid digestion operation of the most favorable quantities of acid and producing crystalloidal relatively high F. A. titanium sulfate solutions, and thereafter by practice of the invention reduce and adjust acidity factor to provide for example for a hydrolysis operation, a titanium sulfate solution having a desired F. A. appreciably lower than the F. A. of the crude titanium sulfate solution obtained from the ore-sulfuric acid digestion operation. The invention similarly provides satisfactory ways for making crystalloidal titanium sulfate solutions having any desirable low F. A., for example, production of stable crystalloidal titanyl sulfate solution which, it will be understood, has F. A. of about zero.

In order to produce crystalloidal low F. A. titanium salt solutions from high F. A. crystalloidal titanium salt solutions, the feature of first importance is prevention of formation of any, even very small amounts of colloidal titanium compounds. Investigations show that once colloidal titanium is produced, if only in a highly localized zone of a main solution the F. A. of which is being reduced, regardless of care with which the subsequent acidity reducing may be carried out, a satisfactory crystalloidal solution is not obtained, apparently because colloidal titanium once formed, although in very small amounts, initiates production of further colloidal titanium in quantity sufficient to prematurely hydrolyze the whole solution. Accordingly, the sought for and accomplished objects of the invention are prevention of formation of colloidal titanium and simplicity of procedural steps from operating viewpoint.

Practice of the process of the invention involves three main considerations: first, temperature control during the entire process; second, increase of the amount of initial solution acid radical compounded with metal (other than titanium) present in the solution; and third, if it is desired to further lower acidity factor, treatment of the mass with certain acid binding agents.

The following described temperature conditions apply to all modifications of the invention in which the mass undergoing acidity reduction is in solution or slurry form as distinguished from the solid state. Temperature of the mass undergoing treatment should be maintained not higher than about 60° C. To secure best results in reasonably large-scale work, and to minimize tendency toward formation of colloidal titanium, temperatures should be held preferably not higher than about 50° C. Minimum temperature is a matter of operating convenience. Where, in either the oxidation operations or in the succeeding treatment of the resulting mass with acid binding agent, it is desired to crystallize out more or less reaction product, e. g. ferrous sulfate, temperature may be slightly above room temperature, e. g. 30-35° C. according to the degree of fluidity desired in the reacting mass. However, even substantially lower temperatures do not in any way affect colloidal character of the solutions made in accordance with the invention.

As applied to production of low F. A. titanium sulfate solutions, the initial relatively high F. A. starting solution may be any suitable crystalloidal titanium sulfate solution of any suitable titanium concentration. Other conditions being equal, the higher the titanium concentration the less is the tendency for formation of colloidal titanium. It is preferred to use starting solution of such titanium concentration, calculated as $TiO_2$, that at any subsequent stage of the process the $TiO_2$ concentration does not fall below about 65 G. P. L. Ordinarily, in the practice of the process there is no major change of titanium concentration, but should particular operating conditions be such that any material decrease of titanium concentration takes place, provision for such decrease may be made by selecting an initial solution of suitably high $TiO_2$ concentration. Usually, starting solutions of not less than 100-120 G. P. L. are sufficiently adequate to provide for incidental titanium concentration drops during the process. At concentrations above 350 G. P. L. solutions as a rule are too viscous to work with conveniently. For best practical results, we prefer to employ starting solutions of titanium concentration within the range of about 125 to about 210 G. P. L.

Generally, inital acidity factor of the starting solution is not important, although of course the F. A. of the starting solution is higher than the F. A. of the ultimate low acid product solution. As a rule, the initial solution should have F. A. of upwards of say 40%, since solutions made by the usual methods of digesting ore and acid and having acidity factors less than about 40% may, in most situations, contain titanium in colloidal form. Usual run of crystalloidal titanium sulfate stock solutions formed by digesting titaniferous ores and sulfuric acid, have F. A. in the upper portion of the range of say 50 to 100%. Solutions of this type, when made according to approved plant practice are crystalloidal, have $TiO_2$ concentrations well above 100 G. P. L. and are well suited for purposes of the present process. The invention is also applicable to production of low F. A. solutions from initial solutions having higher acidity factors, e. g. well above 100%.

According to the present invention it has been found that acidity factor of an initial crystalloidal relatively high F. A. titanium salt solution may be reduced by increasing the amount of initial solution acid radical compounded with metal (other than titanium) present in the solution. This may be accomplished by converting such metal to a higher state of oxidation. Thus the invention includes provision in the solution, F. A. of which is to be reduced, of oxidizable compound comprising metal other than titanium and acid radical present in the initial solution. From practical viewpoint, practice of the invention does not ordinarily involve a positive step of providing such an oxidizable compound in the solution to be treated for the reason that almost all of the usually substantial iron content of the customary run of clarified stock titanium salt solutions such as titanium sulfate solutions is already in the form of ferrous sulfate. Since the degree of acidity reduction by oxidation of ferrous sulfate is directly proportional to the amount of ferrous sulfate contained in a given liquor, starting solutions most adaptable for use in practice of the invention are those relatively high in oxidizable compound such as ferrous sulfate.

As applied to decreasing the F. A. of a titanium sulfate-ferrous sulfate solution, to effect conversion of ferrous sulfate to a higher state of oxidation, the starting solution is treated with any suitable oxidizing agent. The outcome of such treatment is oxidation of ferrous iron to the ferric condition with resultant increase in the amount of $SO_4$ radical tied to iron and a corresponding reduction of the acidity factor of the mass. One outstanding operating advantage of this mode of acidity reduction is that, as long as the above mentioned maximum temperature conditions are observed, the oxidation reaction regardless of the oxidizing agent used and no matter how carried out requires no further manipulative precautions, such as choice of oxidizing agent or control of rate of addition of the oxidizing agent, to effect prevention of formation of colloidal titanium.

A relatively wide choice of oxidizing agents is available. Broadly, any agent which will effect oxidation of the oxidizable compound such as ferrous sulfate is suitable. Selection of the oxidizing agent is more or less dependent upon the particular operation at hand and involves consideration of factors such as whether or not it is desired to materially dilute the solution being treated, or to avoid introduction into the solution of undesired reaction products, and also as to use to which the ultimate product solution is to be put. For example, if some dilution of the solution being treated is unobjectionable and it is desired to avoid incorporating with the reaction mass compounds of another metal, an oxidizing agent such as hydrogen peroxide may be used to advantage, the only by-product of the oxidizing reaction other than the formation of ferric sulfate being introduction into the solution of water in amount depending upon the quantity of hydrogen peroxide used.

Metallic chlorates such as $NaClO_3$, persulfates such as $(NH_4)_2S_2O_8$ and nitric acid are further examples of oxidizing agents of the type the reaction products of which acts only as diluents and of themselves effect no additional acidity reduction. There is also available a second group of oxidizing agents use of which effects acidity factor reduction over and above that brought about by oxidation of ferrous sulfate to ferric. One of these is sodium peroxide. Utilization of this material effects a given degree of acidity reduction by oxidizing ferrous iron to ferric. But also the sodium of the sodium peroxide reacts with $SO_4$ radical present in the mass to form sodium sulfate, thus accomplishing what may be considered secondary F. A. reduction to a degree corresponding with the amount of $SO_4$ which becomes compounded with sodium to form sodium sulfate, the presence of which in the mass in certain operating conditions is unobjectionable. Other oxidizing agents such as barium and lead peroxide react similarly except that the barium and lead sulfate by-products are precipitated as a filterable solid. Permanganates such as $KMnO_4$ and dichromates such as $K_2Cr_2O_7$ are included in the second group since both metals of these compounds react with $SO_4$ radical of the mass to form sulfates of such metals effecting acidity reduction over and above that caused by oxidation of ferrous iron to ferric. Oxidizing agents of the second group may be defined as comprising compounds of a metal reacting with acid radical of the solution being treated to reduce the acidity factor.

It may be desired to subject the low F. A. product solution in the process of this invention to hydrolysis by heating to precipitate crude metatitanic acid for pigment manufacture. In such situation and where it is desired to make a pigment not affected by color the oxidizing agent should be such as to form non-hydrolyzable salt with the titanium salt present in the solution. It will be understood that should such hydrolyzable salts be formed in the acidity reduction operation described, if the resulting low F. A. titanium sulfate solution were hydrolyzed, the crude metatitanic acid precipitate would be contaminated and the final product made by calcining the metatitanic acid probably would be off-color.

The amount of oxidizing agent used is dependent upon features such as the ferrous sulfate content of the starting solution, the degree of acidity reduction desired, and also upon the nature of the particular oxidizing agent employed, i. e. whether or not the oxidizing agent, for example barium peroxide, is of such character that it inherently effects acidity reduction over and above that brought about by oxidation of the ferrous sulfate. To illustrate, in the case of a solution of known ferrous sulfate content, if a given degree of acidity reduction is desired and say barium peroxide is to be used, a lesser amount of barium peroxide would be used than in the situation where the oxidizing agent employed were hydrogen peroxide which brings about acidity reduction only to the extent of increasing the amount of $SO_4$ radical tied to iron. In any event, the quantity of oxidizing agent may be readily determined by calculation or by trial run of particular initial solution and oxidizing agent. To obtain the greatest possible degree of acidity reduction, the amount of oxidizing agent introduced into the process should be such as to convert practically all of the oxidizable compound such as ferrous sulfate to the ferric condition. Oxidation may also be effected electrolytically. For example, oxidation of ferrous to ferric sulfate, consuming free $H_2SO_4$, may be accomplished by means of electrolysis at the anode of a preferably diaphragm-type electrolytic cell.

In a situation where it is desired to reduce acidity factor lower than that attainable by the oxidation operation, the resultant mass thereof may be treated with certain acid binding materials. The acid binding materials employed in the second stage of the process of the invention are those in metallic form, above hydrogen in the electromotive series. Preferably, the metals used are those above hydrogen and below the alkali metals in the series, such as iron, zinc, aluminum and magnesium.

Most of the iron sulfate of the product solution of the oxidizing operation is in the ferric form and hence is readily reducible. The metallic material acidity reduction stage of the present process involves two phases. During the first, assuming use of metallic iron, practically all of the iron is consumed in the reduction of the ferric iron to ferrous sulfate. By what may be termed reaction (a), iron reacts with $SO_4$ radical in the solution forming ferrous sulfate and liberating hydrogen. By a reaction (b), one portion of the latter reacts with ferric sulfate reducing the same to ferrous and forming sulfuric acid. By a reaction (c), the second portion of the hydrogen reacts with titanic sulfate forming titanous sulfate and sulfuric acid. Theoretically there is no acidity reduction since reactions (b) and (c) liberate as much $SO_4$ as $H_2SO_4$ as is taken from the main solution as $FeSO_4$ by reaction (a). Practically, however, some of the hydrogen of reaction (a) escapes as gas with the result that as to the escaped hydrogen of reaction (a) there is no reaction of escaped hydrogen and ferric sulfate and titanic sulfate, and acidity of the mass is reduced to the extent of the $FeSO_4$ formed in production by reaction (a) of $FeSO_4$ and the hydrogen which escapes as gas. Accordingly, while during reduction of ferric iron to ferrous there is theoretically no acidity reduction, practically some further acidity reduction is effected. In this so-called first phase, reduction of the ferric iron to ferrous might be brought about by treating the product solution of the oxidation operation with any reducing agent such as hydrogen sulfide. However, a reducing agent of this type forms a certain amount of sulfuric acid the presence of which would increase rather than decrease the acidity factor of the solution, thus to some extent offsetting acidity reduction accomplished in the oxidation operation. Since the acidity reducing materials mentioned have the practical effect of further reducing rather than increasing acidity factor, it is preferred to use these materials in the first phase, i. e. to preliminarily reduce ferric iron to ferrous, as well as in the second phase of the second stage in which second phase the acidity factor is reduced to the desired ultimate low degree.

In the second phase of the metallic material treatment stage, addition of further amount of metallic iron, after all of the iron sulfate in the solution has been reduced to ferrous state, continues lowering the acidity factor, the added iron combining with $SO_4$ radical of the mass, forming ferrous sulfate. The quantity of metallic iron used depends upon the degree of acidity reduction desired and may be determined by calculation or test run. Use of certain acid binding agents for acidity reduction presents operating difficulties arising from their inherent tendency to cause what appears to be local "over-neutralization" with attendant formation of colloidal titanium compound. For this reason it is necessary to observe certain procedural precautions to prevent formation of colloidal titanium. The previously noted metallic acid binding agents employed in the second acidity reducing stage of this invention afford the substantial operating advantage that, because of their acidity reducing properties, aside from temperature regulation of the mass no manipulative precautions such as control of rate of addition of the acid binding agent, are required to prevent formation of colloidal titanium.

During introduction of metallic iron beyond the point where ferric iron is reduced to ferrous the titanous sulfate content of the mass increases to some extent. Should the presence of appreciable titanous sulfate in the ultimate product solution be undesirable, the titanous sulfate may be reoxidized to titanic by treating the solution with an oxidizing agent in amount just sufficient to reoxidize only the titanous sulfate or with an oxidizing agent not powerful enough to reoxidize iron should it be desired to retain the iron in the ferrous state. Blowing the product solution with air is a simple expedient by which this may be accomplished.

As in the case of the oxidizing agents previously discussed, selection of the metallic acid binding material to be used is more or less dependent upon the particular operation at hand and involves consideration of factors such as whether or not it is desired to avoid introduction into the solution of undesired reaction products, and also as to use to which the ultimate product solution is to be put. For example, if it is desired to avoid incorporating with the reaction mass compounds of another metal such as aluminum, obviously such metallic binding agent should not be employed. Further, should it be desired to subject the low F. A. product solution in the process of this invention to hydrolysis by heating to precipitate crude metatitanic acid for pigment manufacture, where it is desired to make a pigment not affected by color the metallic binding material should be such as to form non-hydrolyzable salt with the titanium salt present in the solution.

EXAMPLE 1

Following is illustrative of practice of the invention to effect acidity reduction of a stock high F. A. crystalloidal titanium sulfate starting solution by first treating the solution with hydrogen peroxide, and further reducing acidity factor by treatment of the solution resulting from the oxidation operation with metallic iron. The crystalloidal starting solution used, analysis of which is given in column A of Table I below, was prepared by digesting ground ilmenite with sulfuric acid, dissolving the digest cake in water, reducing any ferric iron to ferrous, and clarifying and concentrating the liquor, all as known in the art.

Table I

| | A | B |
|---|---|---|
| Grams per liter: | | |
| $TTiO_2$ | 178 | 182 |
| $RTiO_2$ | Present | 12.1 |
| TFe | 46.6 | 57.2 |
| $TH_2SO_4$ | 409 | 314 |
| $FH_2SO_4$ | 109 | Minus 9.9 |
| $AH_2SO_4$ | 327 | 213 |
| Ratio $AH_2SO_4/TiO_2$ | 1.84 | 1.17 |
| Per cent F. A. | 50 | Minus 4.5 |
| Sp. gr. | 1.45 | 1.42 |

In the above $TTiO_2$ represents total titanium concentration calculated as $TiO_2$, $RTiO_2$ represents reduced titanium sulfate (titanous sulfate), TFe represents total iron, $TH_2SO_4$ represents total $H_2SO_4$, $FH_2SO_4$ represents free $H_2SO_4$, $AH_2SO_4$ represents active $H_2SO_4$, and per cent F. A. represents factor of acidity.

37.9 liters of the above high acidity factor starting solution were diluted with 8.35 liters of water to reduce titanium concentration to 145 G. P. L. $TiO_2$. Five liters of 30% $H_2O_2$ were added (while agitating) at a rate such that the temperature of the liquor was kept between 50 and 60° C. By this treatment with oxidizing agent, the F. A. was reduced to about minus 2.3. In the resulting solution, there was then immersed a perforated basket containing 3300 grams of metallic iron (a large excess over that needed in the process). When test of the liquor showed acidity reduction to approximately the sought-for degree (i. e. to about minus 5%) the basket containing unconsumed iron was withdrawn. About 885 grams of iron were needed to reduce ferric iron to ferrous, and about 101 grams of iron were needed to effect the further desired acidity reduction. During treatment with metallic iron the mass was cooled to keep temperature below 60° C. The mass was refrigerated with an ice bath to crystallize ferrous sulfate and the crystals were removed by filtration. The product solution analyzed as shown in column B of Table I. The hereindescribed HCl coagulation test showed the above product solution was crystalloidal.

Crystalloidal product solutions of acidity factors higher or lower than minus 4.5% may be made by the same procedure by suitably varying either or both the amount of oxidizing agent used or the amount of metallic acidity reducing treating agent. However, it is preferred to conduct operations so that the F. A. of the product solutions is not lower than about minus 35%.

EXAMPLE 2

Following is illustrative of practice of the oxidizing agent acidity reduction stage of the invention as applied to a crystalloidal titanium sulfate solution having F. A. substantially lower than that of the high F. A. stock solution used in Example 1. The relatively low F. A. solution treated with oxidizing agent in accordance with Example 2 was made as follows:

Finely ground ilmenite ore (85% thru 325 mesh), about 58.5% of total iron of which was present as ferrous oxide, was mixed with 98% sulfuric acid in ratio of 1.55 parts of $H_2SO_4$ to one part of ore. The acid-ore mixture was agitated and heated externally by means of hot gases from gas burners until reaction between ore and acid was initiated. Digest mass had F. A. between 55 and 60%, and 41.5% of total iron was in ferric state. If this mass were dissolved in water, the titanium sulfate solution formed would have approximately the same F. A. Instead of dissolving in water, the solid mass as such was treated to reduce F. A. to some degree. The digest cake was baked in a muffle furnace for about 3 hours at temperature of about 300° C. The cake lost about 10% by weight. During baking some $H_2SO_4$ was vaporized, some $SO_4$ radical was evolved as visible fumes (mostly $SO_2$), and some ferrous iron was oxidized to ferric, result of heating being reduction of F. A. to about 15%. Baked cake was dissolved in about 1.2 parts by weight of water, ferric iron reduced to the ferrous state by means of metallic iron. The solution was clarified of suspended residue and cooled to about 18° C. to crystallize some $FeSO_4.7H_2O$ which was also removed by filtration. The resulting solution, which was crystalloidal as shown by the herein HCl coagulation test, had a factor of acidity of 10%.

In this instance it was sought to make product solution of about zero F. A. principally by means of acidity reducing action of oxidizing agent alone. To reduce F. A. of one part by weight of $TiO_2$ from plus 10% to zero it was necessary to oxidize 0.14 part of ferrous iron to ferric to consume 0.123 part of free $H_2SO_4$ to effect the desired acidity reduction. The amount of 30% $H_2O_2$ needed to oxidize the 0.14 part of ferrous iron was 0.137 part by weight. The $H_2O_2$ was added to the solution (while agitating) at rate such that temperature was kept below 60° C. Metallic iron was added in quantity to only reduce all ferric iron in the solution to the ferrous state, and some of the total titanium to the trivalent state. The solution was filtered to remove insoluble impurities in the iron used for reduction, and cooled to about 18° C. to crystallize additional $FeSO_4.7H_2O$ which was then removed by filtration. The analysis of the final solution was—

| | Grams per liter |
|---|---|
| $TTiO_2$ | 190.6 |
| $RTiO_2$ | 15.8 |
| $TFe$ | 79.0 |
| $TH_2SO_4$ | 372.0 |
| $AH_2SO_4$ | 233 |
| $FH_2SO_4$ | Zero |
| Ratio $AH_2SO_4/TiO_2$ | 1.23 |

The product solution was crystalloidal as shown by the previously noted HCl coagulation test for absence of colloidal titanium.

The principles of the invention are also applicable to production of crystalloidal low acidity factor solutions from high acidity factor titanium salt solutions other than titanium sulfate. For example, a crystalloidal relatively high F. A. titanium chloride solution containing ferrous chloride may be treated, as described above with respect to titanium sulfate solutions, with oxidizing agent and also if desired with metallic acidity reducing agent to form low F. A. titanium chloride solutions.

Procedural steps described above may be modified to some extent. For example if it were desired to still further lower the F. A. of the product of Example 1, a predetermined amount of the ferrous iron contained therein may be reoxidized and the reduction step likewise repeated. When starting with a very high F. A. liquor, after the initial oxidation and reduction steps, the liquor may be cooled to remove some of the iron sulfate to facilitate subsequent reduction after the second oxidation. Also, the oxidation and reduction steps might be carried out simultaneously.

We claim:

1. The method of lowering the acidity factor of an initial crystalloidal titanium salt solution, of the group consisting of titanium sulfate and titanium chloride and having an acidity factor not lower than 40% and not higher than 100%, without disturbing the crystalloidal characteristics of said solution, the said solution containing an oxidizable compound comprising the acid radical present in the said initial salt solution and a metal other than titanium, which method comprises converting said compound to a higher state of oxidation to thereby increase the amount of the initial solution acid radical associated with said metal of said oxidizable compound and lower the acidity factor of the liquid phase of the resulting mass, the amounts of the oxidizable compound and free acid present in the initial solution and the amount of the oxidizable compound converted to the higher state of oxidation being such that the acidity factor of the liquid phase of said mass is at least 10% less than that of said initial solution, then reducing the compound of said higher state of oxidation to its previous state of oxidation, and during said conversion and reduction operations maintaining a temperature not in excess of 60° C.

2. The method of lowering the acidity factor of an initial crystalloidal titanium salt solution, of the group consisting of titanium sulfate and titanium chloride and having an acidity factor not lower than 40% and not higher than 100%, without disturbing the crystalloidal characteristics of said solution, the said solution containing an oxidizable compound comprising the acid radical present in the said initial salt solution and a metal other than titanium, which method comprises introducing into said solution an oxidizing agent capable of oxidizing said compound to thereby increase the amount of the initial solution acid radical associated with said metal of said oxidizable compound and lower the acidity factor of the liquid phase of the resulting mass, the amount of the oxidizable compound and free acid present in the initial solution and the amount of oxidizing agent introduced being such that the acidity factor of the liquid phase of said mass is at least 10% less than that of said initial solution, then reducing the compound of said higher state of oxidation to its previous state of oxidation, and during the oxidation and reduction operations maintaining a temperature not in excess of 60° C.

3. The method of lowering the acidity factor of an initial crystalloidal titanium salt solution, of the group consisting of titanium sulfate and titanium chloride and having an acidity factor not lower than 40% and not higher than 100%, without disturbing the crystalloidal characteristics of said solution, the said solution containing an oxidizable compound comprising the acid radical present in the said initial salt solution and a metal other than titanium, which method comprises introducing into said solution an oxidizing agent capable of oxidizing said compound and forming non-hydrolyzable salt with the acid radical present to thereby increase the amount of the initial solution acid radical associated with said metal of said oxidizable compound and lower the acidity factor of the liquid phase of the resulting mass, the amount of the oxidizable compound and free acid present in the initial solution and the amount of oxidizing agent introduced being such that the acidity factor of the liquid phase of said mass is at least 10% less than that of said initial solution, then reducing the compound of said higher state of oxidation to its previous state of oxidation, and during the oxidation and reduction operations maintaining a temperature not in excess of 60° C.

4. The method of lowering the acidity factor of an initial crystalloidal titanium salt solution, of the group consisting of titanium sulfate and titanium chloride and having an acidity factor not lower than 40% and not higher than 100%, without disturbing the crystalloidal characteristics of said solution, the said solution containing an oxidizable compound comprising the acid radical present in the said initial salt solution and a metal other than titanium, which method comprises introducing into said solution an oxidizing agent—capable of oxidizing said oxidizable compound and containing a metal reacting with the acid radical of said solution—to thereby increase the amount of the initial solution acid radical associated with said metal of said oxidizable compound and lower the acidity factor of the liquid phase of the resulting mass, the amount of the oxidizable compound and free acid present in the initial solution and the amount of oxidizing agent introduced being such that the acidity factor of the liquid phase of said mass is at least 10% less than that of said initial solution, then reducing the compound of said higher state of oxidation to its previous state of oxidation, and during the oxidation and reduction operations maintaining a temperature not in excess of 60° C.

5. The method of lowering the acidity factor of an initial crystalloidal titanium salt solution, of the group consisting of titanium sulfate and titanium chloride and having an acidity factor not lower than 40% and not higher than 100%, without disturbing the crystalloidal characteristics of said solution, the said solution containing an oxidizable compound comprising the acid radical present in the said initial salt solution and a metal other than titanium, which method comprises introducing into said solution an oxidizing agent—capable of oxidizing said oxidizable compound, containing a metal reacting with the acid radical of said solution, and forming a non-hydrolyzable salt with the acid radical present—to thereby increase the amount of the initial solution acid radical associated with said metal of said oxidizable compound and lower the acidity factor of the liquid phase of the resulting mass, the amount of the oxidizable compound and free acid present in the initial solution and the amount of oxidizing agent introduced being such that the acidity factor of the liquid phase of said mass is at least 10% less than that of said initial solution, then reducing the compound of said higher state of oxidation to its previous state of oxidation, and during the oxidation and reduction operations maintaining a temperature not in excess of 60° C.

6. The method of lowering the acidity factor of an initial crystalloidal titanium sulfate solution having an acidity factor not lower than 40% and not higher than 100%, without disturbing the crystalloidal characteristics of said solution, the said solution containing ferrous sulfate, which method comprises converting said ferrous sulfate to a higher state of oxidation to thereby increase the amount of sulfuric acid radical associated with iron and lower the acidity factor of the liquid phase of the resulting mass, the amount of ferrous sulfate and free acid present in the initial solution and the amount of ferrous sulfate converted to the higher state of oxidation being such that the acidity factor of the liquid phase of said mass is at least 10% less than that of said initial solution, then reducing the compound of said higher state of oxidation to its previous state of oxidation by means of a reducing agent in metallic form, and during said conversion and reduction operations maintaining temperature not in excess of 60° C.

7. The method of lowering the acidity factor of an initial crystalloidal titanium salt solution, of the group consisting of titanium sulfate and titanium chloride and having an acidity factor not lower than 40% and not higher than 100%, without disturbing the crystalloidal characteristics of said solution, the said solution containing a ferrous compound of the acid radical present in the said initial salt solution, which method comprises introducing into said solution an oxidizing agent capable of oxidizing said compound to the ferric state to thereby increase the amount of the initial solution acid radical tied to iron and lower the acidity factor of the liquid phase of the resulting mass, the amount of the ferrous compound and free acid present in the initial solution and the amount of oxidizing agent introduced being such that the acidity factor of the liquid phase of said mass is at least 10% less than that of said initial solution, then reducing ferric compound present to ferrous state, and during the oxidation and reduction operations maintaining a temperature not in excess of 60° C.

8. The method of lowering the acidity factor of an initial crystalloidal titanium salt solution, of the group consisting of titanium sulfate and titanium chloride, without disturbing the crystalloidal characteristics of said solution, the said solution containing a ferrous compound of the acid radical present in the said initial salt solution, which method comprises introducing into said solution an oxidizing agent capable of oxidizing said compound to the ferric state to thereby increase the amount of the initial solution acid radical tied to iron and lower the acidity factor of the liquid phase of the resulting mass, the amount of the ferrous compound and free acid present in the initial solution and the amount of oxidizing agent introduced being such that the acidity factor of the liquid phase of said mass is at least 10% less than that of said initial solution, then reducing ferric compound present to ferrous state by means of a reducing agent in metallic form, and during the oxidation and reduction operations maintaining a temperature not in excess of 60° C.

L'ROCHE G. BOUSQUET
MAXWELL J. BROOKS.